US008002637B1

(12) United States Patent
Mitchell

(10) Patent No.: US 8,002,637 B1
(45) **Date of Patent: *Aug. 23, 2011**

(54) METHOD FOR RETROFITTING AN EXTENDED DISPLAY DEVICE TO AN EXISTING GAMING MACHINE ASSEMBLY

(75) Inventor: Michael Mitchell, Las Vegas, NV (US)

(73) Assignee: Bally Gaming, Inc., Las Vegas, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 11/303,053

(22) Filed: Dec. 14, 2005

(51) Int. Cl.
*G06F 17/00* (2006.01)
*G06F 19/00* (2006.01)
*A63F 9/24* (2006.01)
*A63F 13/00* (2006.01)

(52) U.S. Cl. ................ 463/46; 463/16; 463/20; 463/30; 273/138.1

(58) Field of Classification Search .................... 463/46, 463/47, 16–20, 25, 29–31; 312/7.2, 237, 312/223.1; D21/370; 273/138.1, 139
See application file for complete search history.

(56) References Cited

U.S. PATENT DOCUMENTS 5,655,966 A * 8/1997 Werdin et al. .................... 463/25
5,813,914 A * 9/1998 McKay et al. .................. 463/46
5,951,131 A 9/1999 Stefan
6,113,098 A 9/2000 Adams
6,164,645 A 12/2000 Weiss
6,199,861 B1 * 3/2001 Hume et al. .............. 273/118 R
6,475,087 B1 11/2002 Cole
6,480,243 B2 * 11/2002 Yamamoto ..................... 348/836
6,533,659 B2 * 3/2003 Seymour et al. ................ 463/16
6,620,047 B1 * 9/2003 Alcorn et al. .................... 463/37
6,623,006 B2 * 9/2003 Weiss ......................... 273/138.2
6,688,984 B2 * 2/2004 Cole ............................... 463/46
6,820,875 B1 * 11/2004 Hedrick et al. ............ 273/138.1
6,880,825 B2 * 4/2005 Seelig et al. .............. 273/143 R
D508,269 S * 8/2005 Wichinsky ................... D21/369
6,964,491 B2 11/2005 Nagano
7,184,277 B2 * 2/2007 Beirne .......................... 361/807
7,311,607 B2 * 12/2007 Tedsen et al. .................... 463/32
7,806,770 B2 * 10/2010 Taxon ............................. 463/46
7,837,562 B2 * 11/2010 Griswold et al. ............... 463/46
7,900,922 B1 * 3/2011 Mallory ..................... 273/138.1
7,905,783 B2 * 3/2011 Cole ............................... 463/46
2002/0025852 A1 * 2/2002 Alcorn et al. .................... 463/30
2003/0236114 A1 * 12/2003 Griswold et al. ............... 463/16
2004/0209692 A1 * 10/2004 Schober et al. ................. 463/42
2004/0229693 A1 * 11/2004 Lind et al. ........................ 463/37
2005/0049028 A1 * 3/2005 Gornez et al. .................. 463/20
2005/0064941 A1 * 3/2005 Hedrick et al. ................. 463/46
2005/0215303 A1 * 9/2005 Inoue .............................. 463/16
2005/0215325 A1 * 9/2005 Nguyen et al. .................. 463/46
2005/0227771 A1 * 10/2005 Nelson et al. ................... 463/43
2005/0255924 A1 * 11/2005 Cole ............................... 463/46
2005/0277477 A1 * 12/2005 Hajder et al. ................... 463/46

(Continued)

*Primary Examiner* — Milap Shah
(74) *Attorney, Agent, or Firm* — Russ F. Marsden; David N. Caracappa; Marvin A. Hein

(57) ABSTRACT

A new game cabinet with special top box is disclosed, usable in combination to mount an extended display and associated mounting apparatus (such as a bezel, frame, etc.). This allows a standard base cabinet to be used, without modification, with both standard displays that can be mounted inside the base cabinet, and with extended displays that are too large to be mounted on the base cabinet.

4 Claims, 7 Drawing Sheets

Method For Fitting An Extended Display To An Extended Cabinet Comprised Of A Base Cabinet And An Extender Top Box

U.S. PATENT DOCUMENTS

| | | | | |
|---|---|---|---|---|
| 2005/0288097 | A1* | 12/2005 | Rasmussen | 463/30 |
| 2006/0252496 | A1* | 11/2006 | Rasmussen | 463/20 |
| 2006/0281558 | A1* | 12/2006 | Rifkin et al. | 463/46 |
| 2006/0281559 | A1* | 12/2006 | Luciano | 463/46 |
| 2007/0197301 | A1* | 8/2007 | Cole | 463/46 |
| 2007/0238531 | A1* | 10/2007 | Taxon | 463/46 |
| 2007/0298862 | A1* | 12/2007 | Kidneigh | 463/20 |

* cited by examiner

Method For Fitting An Extended Display To An Extended Cabinet Comprised Of A Base Cabinet And An Extender Top Box

METHOD FOR RETROFITTING AN EXTENDED DISPLAY DEVICE TO AN EXISTING GAMING MACHINE ASSEMBLY

BACKGROUND OF THE INVENTION

1. Field of the Invention

This invention pertains generally to gaming machine cabinets found in gaming establishments such as casinos, Amerindian bingo establishments, and the like. More particularly, the present invention discloses a method and apparatus for fitting larger displays to existing gaming cabinets using a specially designed top box.

2. The Prior Art

Gaming machine cabinets having one of several standard configurations are currently in use in casinos, Amerindian bingo halls, and the like. The standard cabinet configurations include uprights, slant tops, and bar tops.

U.S. Design Pat. D458,971 and D496,407 are two exemplars of upright gaming cabinets, both with top boxes. U.S. Pat. No. 6,820,875 shows an upright style gaming cabinet which has been divided into a system component box and a monitor box. The two together, coupled with removable laminate sides, comprise the game cabinet. U.S. Pat. No. 6,820,875 teaches the use of differently sized monitor boxes where the monitor is mounted inside the monitor box, together a system component box where all the electronics other than the monitor are mounted, plus laminate sides, to configure a gaming machine.

There is a need for better ways of enabling the use of differing displays.

BRIEF DESCRIPTION

Disclosed herein is a novel gaming machine that uses a standard base cabinet with sides, top, bottom, and a back. The front is substantially open, with a specially configured top box (called an extender top box) to allow use of displays that cannot fit inside the base cabinet. When using a normal display, such as a 17" or 19" CRT or flat panel display, the display will be mounted inside the base cabinet. If the standard display or monitor is a flat panel display, then the concept of being mounted inside the base cabinet includes mounting the display as part of a panel assembly that covers part or all of the front of the base cabinet when fully configured. The standard display does not extend beyond the outer edges of the base cabinet when mounted for use. In addition to the display, the base cabinet houses the electronics and mechanical components needed to make the gaming machine operational.

For some markets, there is a need to provide extended (large) displays that cannot fit into the game cabinet. An example of an extended display is a 32" diagonal flat panel display with a 16×9 aspect ratio, mounted in portrait mode in a gaming machine. For displays which are not square, the display may be used with either the shorter side parallel to the top and bottom of the gaming machine (and usually the plane of the floor of the casino), or the longer side parallel to the top and bottom of the gaming machine (and usually the plane of the casino floor). Portrait mode refers to an installation where the shorter side is parallel to the top and bottom of the gaming machine; landscape mode refers to an installation where the longer side is parallel to the top and bottom of the gaming machine.

When an extended display is too large to be mounted in the base cabinet, an extender top box is used to form a larger frontal mounting area on which an extended display can be mounted. The extended display is mounted over the frontal portions of both the base cabinet and the extender top box.

An extender top box can take many forms, but is preferably designed to be aesthetically pleasing without the use of any additional aesthetic components when added to the base cabinet. This allows the extender top box to be readily retrofitted in the field, as well as providing maximum flexibility during the manufacturing of new or refurbished gaming machines. It also minimizes the number of different parts required to either manufacture or retrofit a gaming machine for use with an extended display, as compared to the standard base unit. In addition to being aesthetically pleasing without additional parts beyond the top box itself, the extender top box provides structural support for the extended display and its associated mounting hardware.

The base cabinet and extender top box provide for a novel method of configuring gaming machines with larger than normal displays and associated bezel assemblies (including whatever mounts are used) using very few additional components. The extended display's mountings are designed to cover the front portion of the extender top box (the visible portion of the top box will typically be just the sides), as well as a portion of the front of the base cabinet. A base cabinet is typically configured with two front panels; a lower front panel that includes the button deck and other player I/O devices, and an upper front panel that includes the viewable portion of the standard display and the display's associated bezel. If the display is mounted to the upper front panel, it also includes the display's mounting hardware; otherwise the display is mounted in the cabinet and the upper front panel includes a display area through which the display is viewed.

The upper and lower panels may be attached in several ways, but are usually hinged. The extended display, its bezel or other trim, and its associated mounting hardware is intended to cover the same front portion of the base cabinet as was previously covered by the upper panel and the standard display, plus the front of the extender top box. This allows the rest of the base cabinet, including any other front panels if used, to remain the same.

It would be possible to design an extender top box with a portion visually above the top of the extended display, but this embodiment is not currently seen as a preferred embodiment. If there is a need for a visual portion above the extender top box and the extended display and bezel, the currently preferred embodiment is to provide a secondary top box on top of the extender top box. However, the extender top box disclosed herein includes the possibility of providing a visual portion above the extended display and bezel if needed.

DETAILED DESCRIPTION OF PREFERRED EMBODIMENTS

Figure 1:
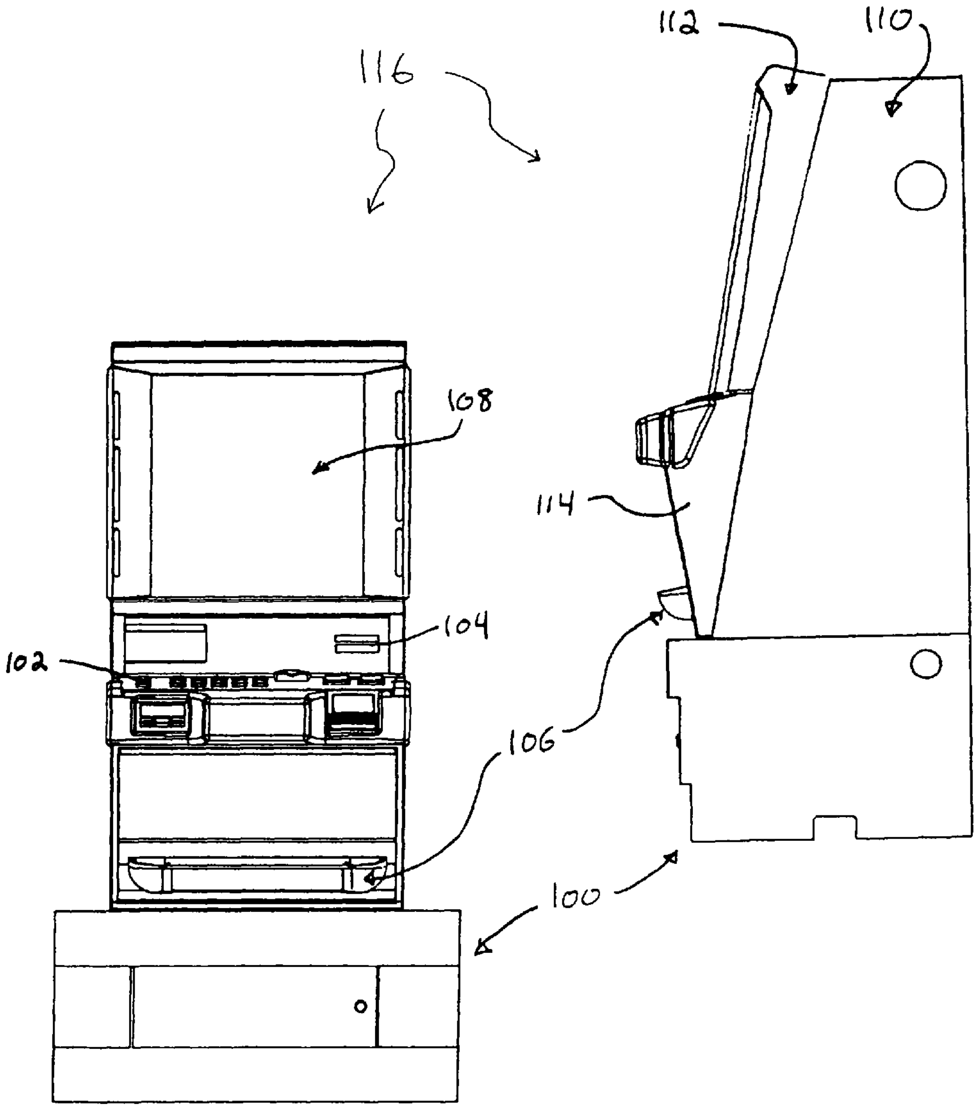
FIG. 1 illustrates a base cabinet.

Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIGS. 1 through 7. It will be appreciated that the apparatus may vary as to configuration and as to details of the parts without departing from the novel concepts disclosed herein. Methods may vary as to details, partitioning, repetition, step inclusion, and the order of the acts, without departing from the novel concepts disclosed herein.

FIG. 1 shows a standard sized gaming machine on a base box 100. Base boxes are typically used to set the desired play-height of the gaming machine for each establishment. Base boxes are shown for contextual reasons only.

Gaming machine 116, shown in frontal and side views, is an exemplar game cabinet currently being produced by applicant Bally Systems, Inc. The exterior can be configured in a variety of ways. One example is coin tray 106 which is still desired by many operators. However coin tray 106 may be replaced with a block-off plate or with a player-convenience shelf in coinless applications. A wide variety of configurations of the base game cabinet are possible, including customized button decks, bezel shapes, differencing input devices, player tracking screens, and other build variations. These (and other variations) are equivalent for the purposes of the novel ideas discussed herein.

Continuing with FIG. 1, also shown is player panel 102 on which there are player input devices (shown is a traditional button deck), a ticket reader/printer 104 (could also be a card reader and/or a bill acceptor), and a display 108. Display 108 is surrounded by a bezel assembly 112. Bezel assembly 112 may be structural (part of a door that swings open on hinges to allow access to the insides of the cabinet for service) or may be decorative. Also shown is gaming machine side 110, which is the side of the base cabinet. A base cabinet is a cabinet enclosure comprised of two sides, a back, a top, a bottom, and a substantially open front area configured to accept display panel assembly 112 and lower front assembly 114. The interior of base cabinet 110 is where all the internal parts of a gaming machine are mounted, including (as needed) but not limited to coin acceptors, coin dispensers, bill acceptors, card readers, display mounts (display mounting may be part of a hinged or removable assembly with bezel 112), power supplies, the main processing board and associated electronics, ticket printers and readers, and other components needed to make a functional gaming machine. The concept of a base cabinet encompasses all the manufacturing variations that occur when building model variants, such as drilling different mounting holes or providing a variety of mounts for various component configurations, variable hinging or other front panel attachment means for both upper and lower panel assemblies, variable internal bracketing depending on configuration, and differing internal bracing, welding, and various attachment/fixing means to attach the sides, top, and bottom of the base cabinet together, etc. These and other base cabinet build options, while using the same basic components for the cabinet, will be apparent to a person of skill in this art who has the benefit of the present disclosure.

The display size for a base cabinet is limited by the height and width of the base cabinet. The base cabinet cannot be too wide, or they will take up too much space on casinos floors (the width of the "foot print" of the cabinet will be too large). Further, the height is limited by the need to allow its use in installations where ceiling height may be limited or where there is a desire to create visual open space above the gaming machines, including enabling players, when standing, to see over the machines to other parts of the casino. Thus, considerations ranging from the most popular display size, to player expectations, to casino footprint and height requirements, to packaging, shipping, and weight concerns all determine height limitations for base gaming machine cabinets.

Displays are mounted inside the base cabinet. Display mounts include traditional CRT shelving or bracketry inside the base cabinet, as well as flat panel displays mounted either inside the cabinet or mounted as part of the upper front panel door (bezel assembly 112), which may be hinged or removably set in place. In all cases, the base cabinet is built as a single unit.

Figure 2:
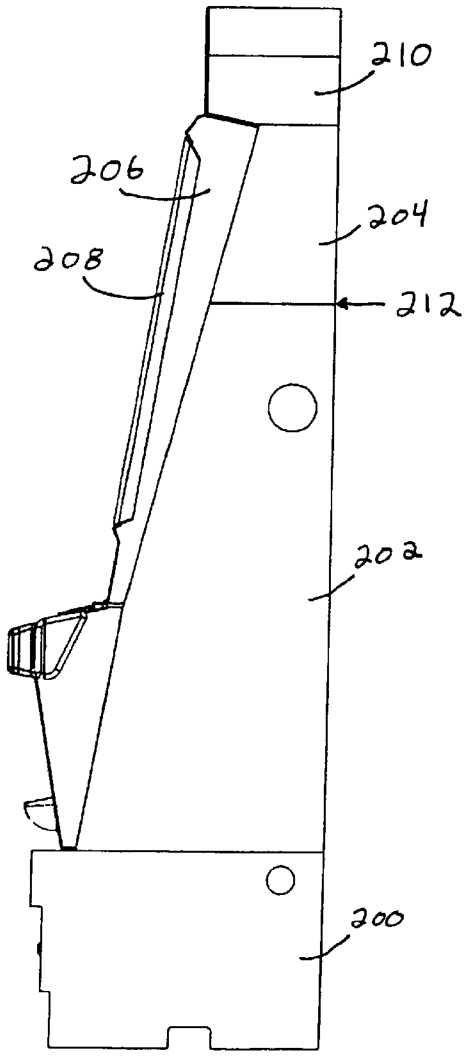
FIG. 2 is a side view of an extended gaming cabinet in accordance with the present invention.

To allow the use of one base cabinet with multiply-sized displays, including displays that are too large for the base cabinet, a uniquely designed display/bezel assembly with an extended top box is provided. FIG. 2 shows a side view of base cabinet 202. For illustrative purposes this is the same base cabinet as shown in FIG. 1, but any base cabinet, extended display with bezel assembly, and extended top box designed to present a visually unitized gaming machine fall within the novel aspects of the present disclosure. With base cabinet 202 is unique top box 204 plus an extended display 208 and extended bezel assembly 206. Top box 204 does not contain screen 208; rather, it provides for a dimensional extension of base cabinet 202 using separate top box 204 that enables mounting of an extended bezel 206 and display 208 assembly. Top box 204 is mounted to the top of base cabinet 202, with the junction between the top of base cabinet 202 and bottom of top box 204 shown as line 212. Any mounting technique may be used as is now know or as may be developed in the future. One embodiment is to removably mount top box 204 with bolts or other removable mounting means. However, in some circumstances it is foreseen that the conversion to the extended display configuration may be permanent, in which case top box 204 may be permanently fixed to base cabinet 202 using rivets, industrial adhesives, or other fixing means. Base cabinet 202 and top box 204 are preferably designed to present a finished gaming machine with the extended cabinet attached, not requiring any other external parts or modifications. Not requiring any external additions such as side panels covering the sides of the extended cabinet assembly, for either the base or extended configuration, enables economical manufacturing of cabinets in either configuration, as well as efficient upgrading paths in the filed. However, a casino could certainly add decorative moldings or exterior side panels if so desired, and if a market needs additional decorative attachments at the joint between the top box and base cabinet, it can readily be provided during manufacturing or as part of a retrofit kit.

Also shown in FIG. 2 is secondary top box 210. This is an optional addition to top box 204. Secondary top box 210 is an additional box assembly that extends over the top of extended display and bezel assembly 206. This configuration is made available for operators who wish to have an additional attract-mode display or static display visually above extended bezel/display assembly 206. Secondary top box 210 will typically be removably fixed to top box 204, although it would be possible to permanently fix the two top boxes together.

The novel top box and base cabinet disclosed herein, when used together, forms a mounting area able to accommodate unique screen configurations for specialized markets. Base cabinet 110 will typically have a 17" or 19" display 108 mounted therein, with accompanying bezel 112. Base cabinet 110 can be configured to use either traditional CRT displays or any available flat panel display (any flat panel technology may be used, including but not limited to plasma displays, LCD displays, etc.). Some markets require an extended display, such as the 32" diagonal, 16×9 aspect ratio flat panel display 208 mounted in portrait mode shown in FIG. 2. This display will measure approximately 27" top-to-bottom and 16" side-to-side. This extended display cannot fit in base cabinet 110 (in FIG. 2, base cabinet 202).

Top box 204 in combination with base cabinet 202 provides an extended cabinet usable to mount an extended display, such as the aforementioned 27"×16" (approx.) display 208. This entails no external changes to the base cabinet. The old display and associated bezel (typically a door) 112 are removed (alternatively, never installed if the top box is installed on an assembly line). Top box 204 is installed on top of base cabinet 202. Extended or large display 208 and associated bezel 206 are then installed, covering the fronts of both base cabinet 202 and top box 204.

Any fastening means may be used for display 208 and bezel 206. For example, display 208 may be fastened to the back of bezel 206, with the entire assembly then fastened to the front of the combination cabinet 202/204. Display 208 may be fastened to combination cabinet 202/204, with the bezel 206 being hingedly or fixedly fastened over the attached display and being a removable decorative overlay. Or, bezel 206 may be part of a hinged or fixedly attached assembly that also incorporates display 208. Any and all fastening means, including but not limited to being hinged, hinged with opening damper or positional locking devices, hooked, sprung, latched, screwed, bolted, etc., may be used to attach an extended display and bezel to the novel extended cabinet of the present disclosure.

Figure 3:
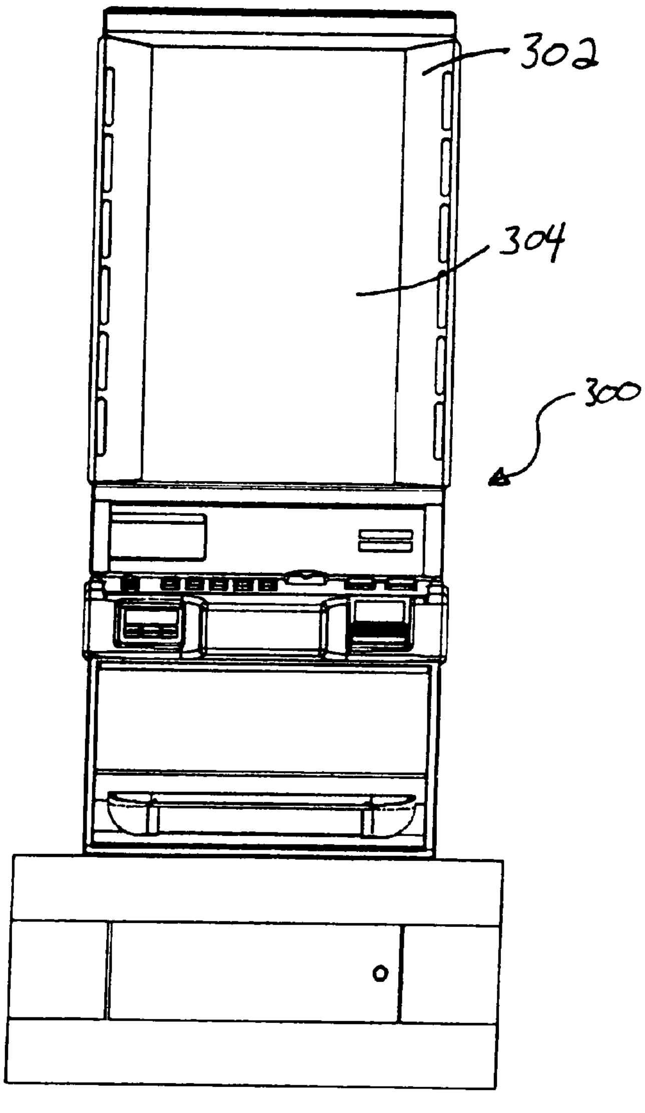
FIG. 3 is a front view of an extended gaming cabinet in accordance with the present invention.
Figure 4:
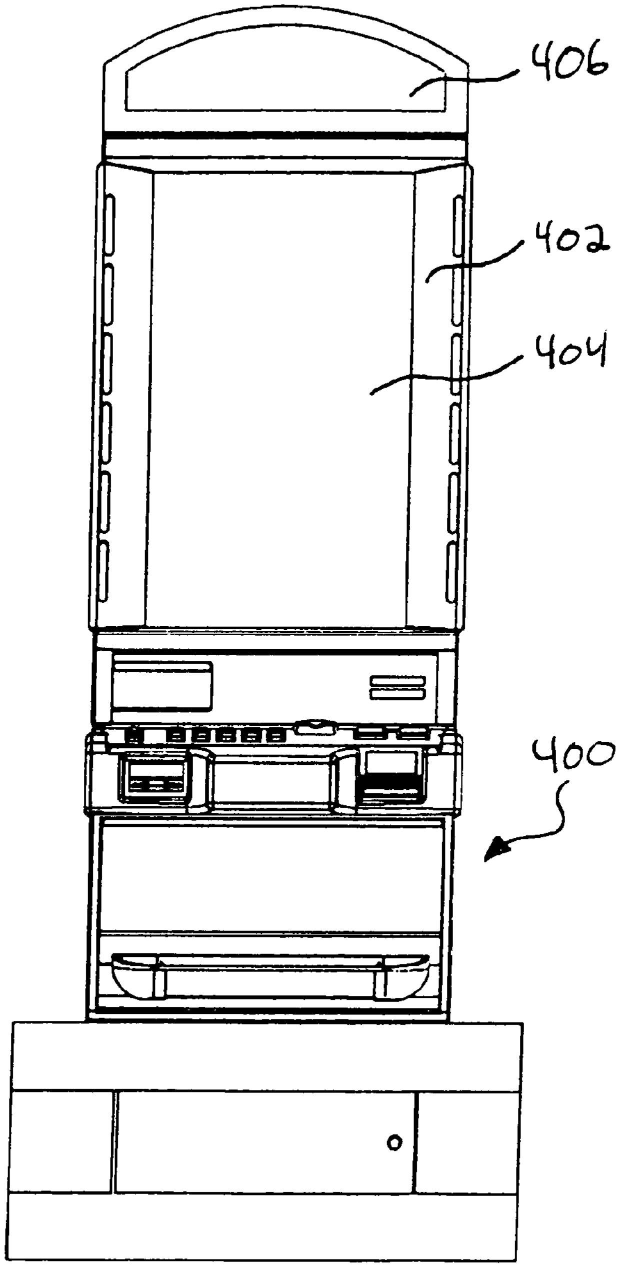
FIG. 4 is another front view of an extended gaming cabinet in accordance with the present invention.

FIG. 3 shows a front view of an extended cabinet 300. Although not visible, extended cabinet 300 comprises a base cabinet and top box as shown in FIG. 2. Extended bezel 320 surrounds extended display 304. FIG. 4 shows a front view of extended cabinet 400 with extended bezel 402 and extended display 404. Also shown is a frontal view of secondary top box 406. The center of secondary top box 406 may have a static display, or may have its own flat panel or LCD-type display to entertain players, separate from extended display 404.

Figure 5:
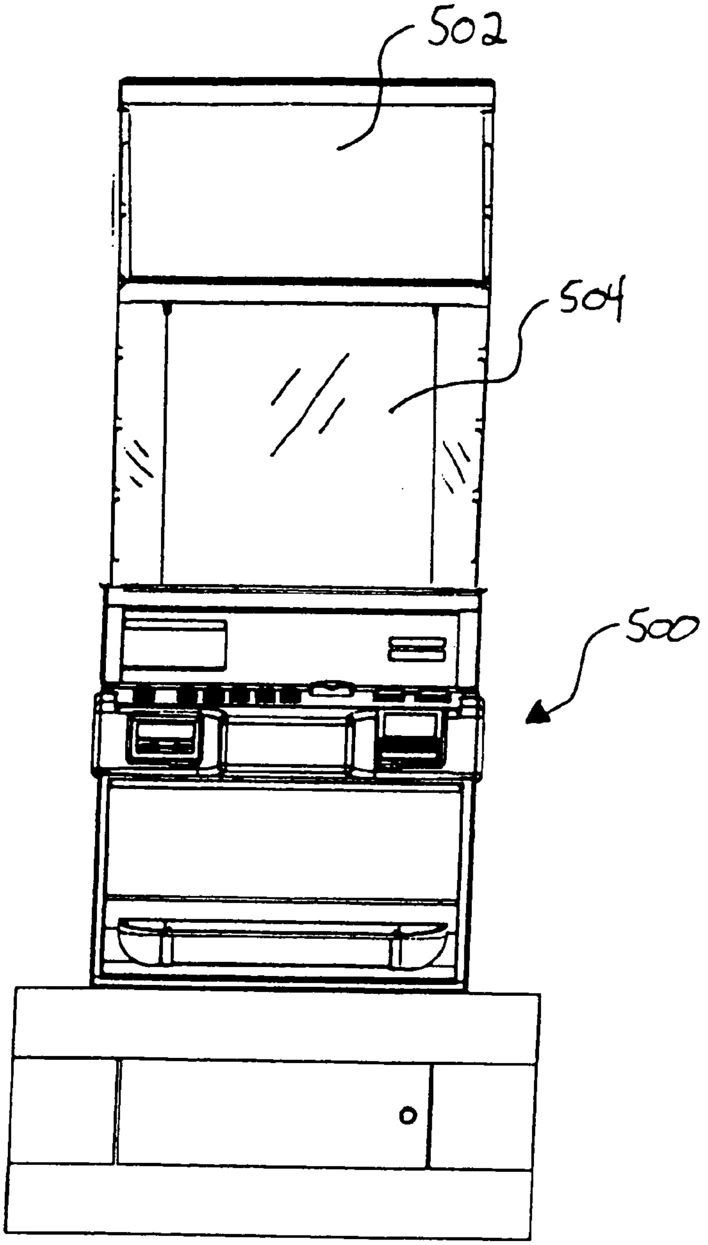
FIG. 5 illustrates an inner divider or replacement door panel for the base cabinet portion of an extended cabinet in accordance with the present invention.
Figure 6:
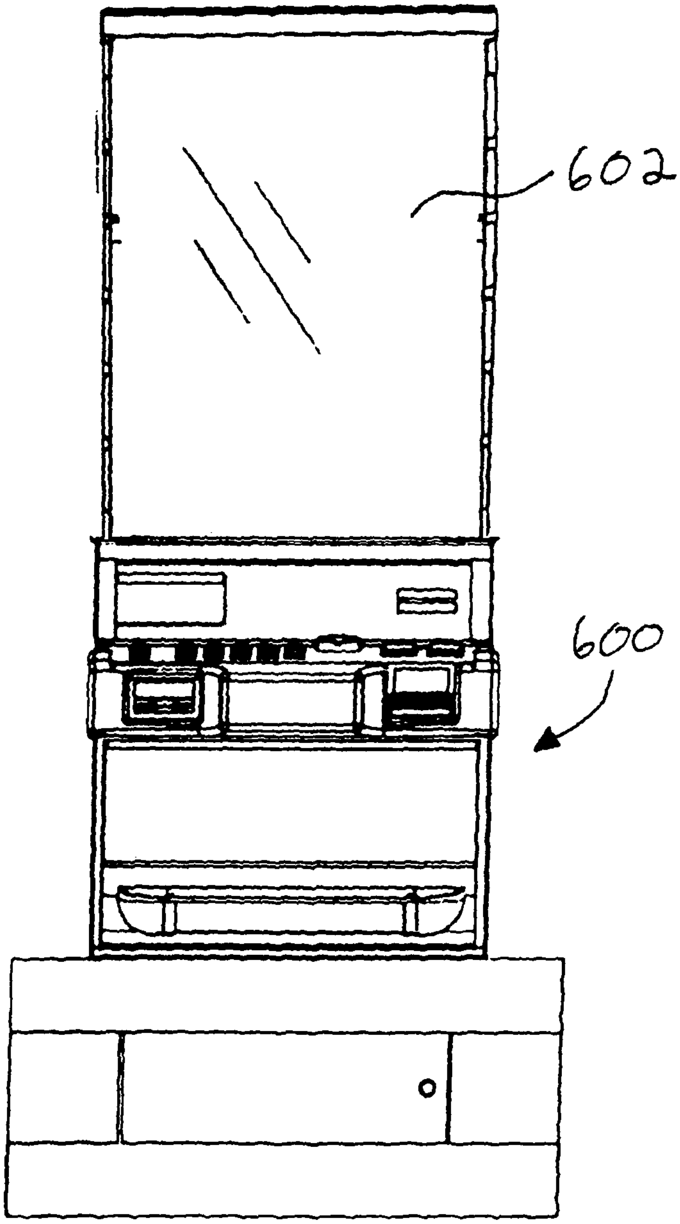
FIG. 6 illustrates an inner divider or door panel covering the frontal portions of a base cabinet and a top box of an extended cabinet in accordance with the present invention.

FIG. 5 shows a front view of an extended cabinet 500 with top box 502. The base cabinet portion of extended cabinet 500 shows sheet steel 504 installed over the otherwise open frontal area of the base cabinet portion of extended cabinet 500. The front of top box 502 is left open. There may be a need to have this or a similar steel partition or divider installed for either security reasons or structural reasons. If for security reasons, steel (or other material) divider 504 will typically have a lock on the right-hand side and will be hinged on the left side, viewed from the front (lock and hinge not illustrated). If for structural reasons, it will typically be bolted, screwed, or pinned into place. Likewise, FIG. 6 shows a similar plate 602 located between the extended cabinet 600 and any display and bezel assemblies, with plate 602 covering the frontal openings of both the base cabinet and the top box. Its mounting will be similar as described for FIG. 5, and will depend on the reason for provided the divider.

Figure 7:
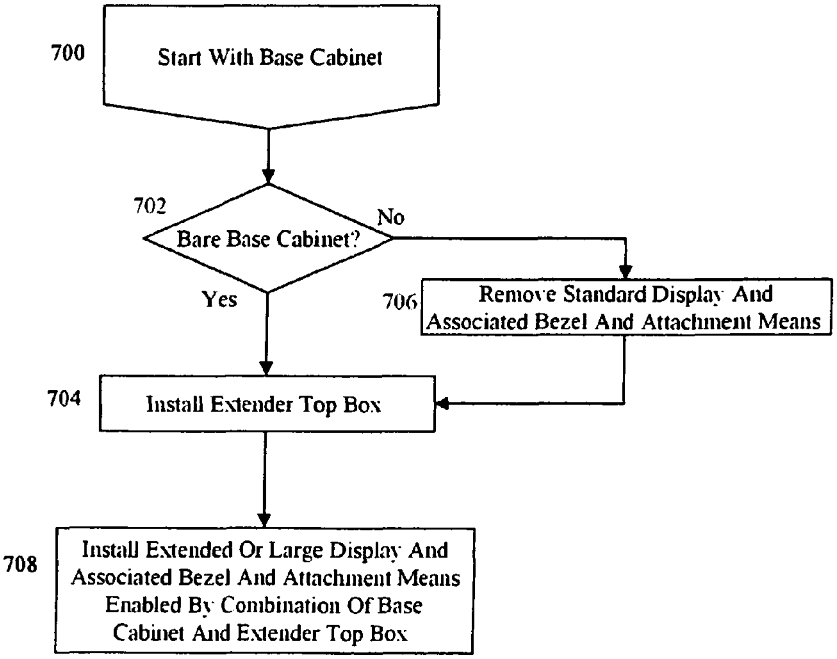
FIG. 7 is a flow diagram for configuring a gaming machine with an extended display using a standard base cabinet and an extender top box.

Continuing with FIG. 7, illustrated is a method for fitting an extended display to a base cabinet using an extender top box. As explained above, "extended display" means any display that cannot be mounted in a base cabinet due to its size. "Base cabinet" means any gaming machine cabinet intended for use in any gaming environment where gaming outcomes are determined at least partially by chance, including but not limited to Class II and Class III gaming as defined in 25 USC §2710 et seq. This includes but is not limited to bingo, keno, lotteries, slots and other traditional Nevada-style games, poker, and Class III central determination gaming exemplified by the Amerindian casinos in the State of Washington. A base cabinet comprises a back, top, bottom, two sides, and a substantially open front. The front is covered by at least one detachable or moveable front panel when a gaming machine is fully assembled using the base cabinet, forming an interior or enclosed space thereby. The enclosed space contains the internal parts of a gaming machine needed to make it functional, including but not limited to a main processor board and associated electronics and logic programming, and a display or, if the display is mounted in a removable or hinged manner to a front panel, where the back of the display or the mountings thereby are exposed to the base cabinet's enclosed space. "Extender top box" means a structure providing mounting areas and/or structural support needed for the extended display/bezel assembly above the top of the base cabinet, and further providing a visually congruous appearance with the base cabinet so as to not require any further additions to make a complete extended gaming machine cabinet assembly. One extender top box embodiment, currently expected to be the most popular, has a top, two sides, and a back which provide any needed mounting areas or structural support to the extended display and bezel assemblies, and also having a bottom or other attachment means (brackets, etc.) so as to allow the extender top box to be attached to the top of a base cabinet such that its open portion is facing in the same direction as the front of the base cabinet. One embodiment will have a full bottom. Another embodiment is to have the extender top box fully enclosed (have a substantially planar front panel) to provide addition mounting points and/or structural support to the extended display and bezel assembly, and in some cases allow the back to be open, partially open, or have an access door; these are not expected to be the most common configurations. A further embodiment will have two brackets or side elements, designed to be attached to opposite sides of the top of the base cabinet and providing support for the extended display and bezel assembly along its side or edge portions that extend above the base cabinet, with the display/bezel assembly having built-in support across its top (between the two side elements or brackets). Alternatively, the two side brackets can be supplemented with a front portion or bracket connecting the two side brackets to provide additional structural support for the extended display/bezel assembly. Other embodiments will become apparent to one of skill in the art who also having the benefit of the present disclosure; all such variations are within the novel concepts described herein.

Continuing with FIG. 7, the actions corresponding to box 700 are to provide a base cabinet. The base cabinet may be part of an already existing gaming machine or may be a bare base cabinet. If the cabinet is bare, it may be a new base cabinet on an assembly line or could bare as the result of an existing cabinet being partially or fully stripped in preparation for updating or refurbishment. Continuing into diamond 702, the "No" exit is taken if the cabinet is not bare, and the "Yes" exit is taken if the cabinet is bare.

If the "No" exit is taken, box 706 is entered. The actions corresponding to box 706 are those needed to prep the cabinet for fitting the Extender Top Box and then the Extended Display and Bezel Assembly. Usually this involves removing the pre-existing upper front panel that includes at least the bezel (typically there will be an upper and lower front panel, but there may be a single front panel, more than two front panels, etc.). If the old display did not come out as part of the panel, it will be removed next. Since the extended display is a flat panel display (not a CRT), any old display brackets attached to the inside of the base cabinet can be left if they don't interfere with the back of the extended monitor and bezel assembly. After removing the existing bezel, monitor, and associated parts not be used with the new parts (for example there may be a hinge or two used in both configurations, a common door shock absorber, or other shared items), the base cabinet is now ready to have the new extender top box and extended display/bezel assembly installed. Box 706 is left for box 704.

Returning to diamond 702, if the cabinet is already bare (alternatively, already to have the new parts installed although it is not necessarily empty), the "Yes" exit is taken directly to box 704.

The actions corresponding to box 704 are those associated with mounting the extender top box to the top of the base cabinet. As explained above, this may be a permanent or removable attachment. The extender top box is designed to meet both aesthetic and structural requirements as pertains to the now extended gaming machine cabinet. Aesthetic solutions are too numerous to even begin to list; however, one embodiment expected to be commonly used is paint both the base cabinet and the extender cabinet crinkle or flat black, and have the joint between the two be visually smooth (form a continuous visual line), which makes the joint visually disappear (very hard to detect). Another embodiment will have the top box deliberately start a new visual line from the joint up, such as expanding outward to form a silhouette reflective of the game theme (a diamond outline for a game having diamonds as a theme, for example). Still another embodiment will have the top box be visually distinct through the use of attract-mode lights mounted inside with portions of the sides being translucent, or attract-mode lights mounted on the outside in colors or shapes themed the same as the base game. Other aesthetic variations will come to the mind of a designer skilled in this art who also have the benefit of the present disclosure, with the idea of crating a visual whole to the player and without requiring the use of additional side panels or the like (although they could always be added as an option, they are not required).

The actions corresponding to box 708 are those needed to mount the extended screen and extended bezel assemblies to the now extended cabinet. As explained above, there are numerous ways of attaching the display and bezel to the extended game cabinet, all fully contemplated herein. In some embodiments, the display will be mounted to the bezel to form an assembly, the assembly then being rigidly or hingedly attached to the extended cabinet. Alternatively, the extended display will be mounted rigidly or hingedly to the extended cabinet, with the bezel assembly mounted to fit over the already mounted display. Other mounting embodiments will be apparent to a person of skill in this art who also has the benefit of the present disclosure.

The present invention has been partially described using a flow diagram. As will be understood by a person of ordinary skill in the art and with the benefit of the present disclosure, steps described in the flow diagram can vary as to order, content, allocation of resources between steps, times repeated, and similar variations while staying fully within the inventive concepts disclosed herein. Further, although the description above contains certain specificity, the described embodiments should not be construed to indicate the scope of the invention; the descriptions given are providing an illustration of certain preferred embodiments of the invention. The scope of this invention is determined by the appended claims and their legal equivalents.

What is claimed is:

1. A method for retrofitting an extended display device to a gaming machine assembly, said method comprising the steps of:

providing an existing gaming machine base cabinet having a front and an existing display device, said existing display device not extending vertically beyond said gaming machine base cabinet front when attached thereto;

preparing the existing gaming machine base cabinet by removing the existing display device;

providing an extended display device, said extended display device extending vertically beyond said existing gaming machine base cabinet front when attached thereto;

providing a top box having a front;

attaching said top box to said base cabinet of the prepared existing gaming machine to provide a vertical dimensional extension of said existing gaming machine base cabinet; and attaching said extended display device to said prepared existing gaming machine base cabinet and said top box, such that said extended display device at least partially covers both said base cabinet and said top box.

2. The method of claim 1, further comprising:

attaching a secondary top box to said top box, wherein said extended display device attaches to said gaming machine assembly such that at least a portion of said secondary top box is uncovered.

3. The method of claim 1, wherein at least one of said base cabinet front and said top box front is at least partially solid.

4. The method of claim 1, wherein at least one of said base cabinet front and said top box front is at least partially covered by a plate.

* * * * *